(12) United States Patent
Liu

(10) Patent No.: US 6,169,667 B1
(45) Date of Patent: Jan. 2, 2001

(54) POWER SYSTEM UTILIZING IMPROVED POWER CONVERTER

(75) Inventor: Rui Liu, Plano, TX (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/160,414

(22) Filed: Sep. 25, 1998

(51) Int. Cl.[7] .................................................. H02M 3/335
(52) U.S. Cl. ............................................... 363/24; 363/17
(58) Field of Search ................................. 363/24, 16, 17, 363/58, 132, 50, 56, 131; 323/224

(56) References Cited

U.S. PATENT DOCUMENTS

| | | | |
|---|---|---|---|
| 4,209,826 | * | 6/1980 | Priegnitz ................................. 363/21 |
| 4,525,774 | * | 6/1985 | Kino et al. ............................. 363/17 |
| 4,591,779 | * | 5/1986 | Carpenter, Jr. et al. .............. 323/301 |
| 4,628,426 | * | 12/1986 | Steigerwald ........................... 363/17 |

\* cited by examiner

Primary Examiner—Peter S. Wong
Assistant Examiner—Rajnikant B. Patel
(74) Attorney, Agent, or Firm—Locke Liddell & Sapp LLP

(57) ABSTRACT

A power system utilizing a method and apparatus to cost-effectively and efficiently supply power to an electrical system requiring a switchable main power source and a continuous auxiliary power source. Specifically, the power system utilizes an improved power converter having a main output circuit and an auxiliary output circuit coupled to a common input circuit. Primary switching circuitry in the input circuit, secondary switching circuitry in the main output circuit, and capacitance in the auxiliary output circuit allow for the systematic control of the main output from the power converter to the electrical system. In particular, the main output circuit can be switched on and off without interrupting the auxiliary output circuits supply of electrical power to the electrical system. Moreover, switching at a zero current state allows for the use of more cost-effective and efficient circuitry. The power system method and apparatus of the present invention produces functionality and operating characteristics similar to using two separate and independent power systems to supply an electrical system but with increased efficiency as well as reduced cost and complexity.

6 Claims, 3 Drawing Sheets

POWER SYSTEM UTILIZING IMPROVED POWER CONVERTER

FIELD OF THE INVENTION

The present invention relates to a method and apparatus to achieve a more efficient and cost-effective power system to supply electrical power to an electrical system. More particularly, it is concerned with a power system incorporating an improved power converter designed to share a common power input circuit while maintaining necessary isolation to achieve desired functionality in both a main output circuit and an auxiliary output circuit.

BACKGROUND OF THE INVENTION

Power systems used to supply electrical power to electrical devices and systems typically incorporate a power converter. As used herein the term "power converter" refers to the electrical apparatus or circuitry designed to connect a power source to an electrical device or system. A power converter typically converts input electrical power from a power source into the correct voltage and current to be used by the electrical system or device. The term "power system" will be used herein to refer generally to the combination of a power source and a power converter which together supply electrical power to an electrical system or device.

Many of today's electrical devices and systems require a main power system and an auxiliary power system. Typically, the main power system is used to supply electrical power sufficient to operate and perform the major functions of the electrical system or device, while the auxiliary power system is used to supply electrical power sufficient to operate and maintain auxiliary portions of the electrical system, such as the system's housekeeping functions. In a television set, for example, the main power system would be used to supply electrical power in order to turn on and operate the television screen, tuner, speakers, etc., while the auxiliary power system would be used to supply electrical power needed to maintain the television's settings stored in memory.

In electrical systems such as these, two power systems are required because of the differing power requirements of the auxiliary and main portions/functions of the electrical system or device. In particular, the electrical system's auxiliary functions generally require continuous power, i.e., the power to this portion of the electrical system should not be turned off. The electrical system's main/major functions, however, are typically switchable. As used herein the term "switchable" means it is designed to be turned on and off. As a result of these characteristics, two power systems are typically used so that one power system can be kept on in order to supply continuous electrical power to the electrical system's auxiliary functions (the auxiliary power system) while the other power system can be switched on and off to operate the electrical system's main functions (the main power system).

Although a single power system could be designed with sufficient power capacity to supply power to operate both the electrical systems main functions as well as the system's auxiliary functions, this would result in an undesirable and inconvenient system. In particular, if a single power system were used it would have to be kept on in order to supply continuous electrical power to the electrical system's auxiliary functions. But, this would necessarily preclude turning off the power supplied to the electrical system's main functions since both the auxiliary and main portions of the electrical system would be utilizing the same power system. It would clearly be undesirable to have to keep the entire electrical system on in order to maintain the system's auxiliary functions. For example, it would be inconvenient to be forced to keep a television on all of the time in order to maintain the television's date/time, preferred channels, and other housekeeping functions stored in memory.

In addition to convenience issues, however, such a single-power-system design would also be inefficient. As a result of the differing functions of the main and auxiliary portions of the electrical system, the main power system is generally required to provide a majority of the electrical power to the electrical system whereas the auxiliary power system provides a relatively small electrical power to the electrical system. Thus, having a switchable main power system is not only desirable from a convenience standpoint, but it also allows the main portion of the electrical system a to be turned off in order to conserve energy.

In sum, then, it is desirable to design a main power system such that it can be turned off when the main functions of the electrical device or system are not in use, and an auxiliary power system which is sufficiently isolated from the main power system such that when the main power system is turned off, the auxiliary power system will stay on. Although this could be accomplished by simply having two completely separate and independent power systems supplying the electrical system, this would be an expensive solution given the duplication of certain portions of the power systems. What is needed is a design scheme that provides a switchable main power system with an isolated auxiliary power system which will provide continuous power to the system's auxiliary functions whether the main power system is on or off, wherein the main and auxiliary power systems share as many components as possible to reduce cost, and wherein the electrical components used are cost-effective and efficient.

SUMMARY OF THE INVENTION

To this end, in accordance with the present invention, there is described a method and apparatus that provides a power system having operating characteristics and functionality similar to, but without the associated costs of, an electrical system having two entirely separate power systems. More particularly, the present invention describes a power system having a power converter which shares a common input circuit while maintaining the necessary isolation and functionality of an auxiliary output circuit and a main output circuit.

The inventive electrical power converter of the present invention comprises: an input circuit adapted to receive electrical power from a power source; a main output circuit coupled to the input circuit and adapted to receive electrical power from the input circuit and to supply a main output power to an electrical system; an auxiliary output circuit coupled to the input circuit adapted to receive electrical power from the input circuit and to supply an auxiliary output power to an electrical system; a primary switching circuit connected to the input circuit operable in a first state to disconnect the input circuit such that the input circuit is prevented from supplying power to the main output circuit and the auxiliary output circuit, and operable in a second state to connect the input circuit such that the input circuit can supply power to the main output circuit and the auxiliary output circuit; a secondary switching circuit connected to the main output circuit operable in a first state to disconnect the main output circuit such that the main output circuit is prevented from supplying the main output power to an electrical system, and operable in a second state to connect the main output circuit such that the main output circuit can supply the main output power to an electrical system; and capacitance connected to the auxiliary output circuit which charges when the auxiliary output circuit receives power from the input circuit, and which discharges when the auxiliary output circuit is not receiving power from the input circuit thereby temporarily maintaining the auxiliary output power to an electrical system.

The inventive method of controlling an electrical power converter according to the present invention, comprises the steps of: a.) Providing a power converter comprising: an input circuit adapted to receive electrical power from a power source; a main output circuit coupled to the input circuit and adapted to receive electrical power from the input circuit and to supply a main output power to an electrical system; an auxiliary output circuit coupled to the input circuit adapted to receive electrical power from the input circuit and to supply a auxiliary output power to an electrical system; b.) disconnecting the input circuit such that the input circuit is prevented from supplying power to the main output circuit and the auxiliary output circuit; c.) disconnecting the main output circuit such that the main output circuit is prevented from supplying the main output power to an electrical system; and c.) reconnecting the input circuit such that the input circuit can supply power to the main output circuit and the auxiliary output circuit.

An alternative embodiment of the inventive method of controlling an electrical power converter according to the present invention, comprises the steps of: a.) providing a power converter comprising: an input circuit adapted to receive electrical power from a power source; a main output circuit coupled to the input circuit and adapted to receive electrical power from the input circuit and to supply a switchable main output power to an electrical system; an auxiliary output circuit coupled to the input circuit adapted to receive electrical power from the input circuit and to supply a continuous auxiliary output power to an electrical system; a primary switching circuit connected to the input circuit adapted to disconnect the input circuit such that the input circuit stops supplying power to the main output circuit and the auxiliary output circuit; a secondary switching circuit connected to the main output circuit adapted to disconnect the main output circuit such that the main output circuit stops supplying main output power; capacitance connected to the auxiliary output circuit adapted to temporarily maintain auxiliary output power when the auxiliary output circuit is not receiving power; b.) using the primary switching circuit to disconnect the input circuit such that the input circuit is prevented from supplying power to the main output circuit and the auxiliary output circuit; c.) using the secondary switching circuit to disconnect the main output circuit such that the main output circuit is prevented from supplying main output power; and d.) using the primary switching circuit to reconnect the input circuit such that the input circuit can supply of power to the main output circuit and auxiliary output circuit.

The features and advantages of the invention will become more readily understood from the following detailed description taken in conjunction with the appended claims and attached drawings wherein:

DETAILED DESCRIPTION OF THE DRAWINGS

Figure 1:
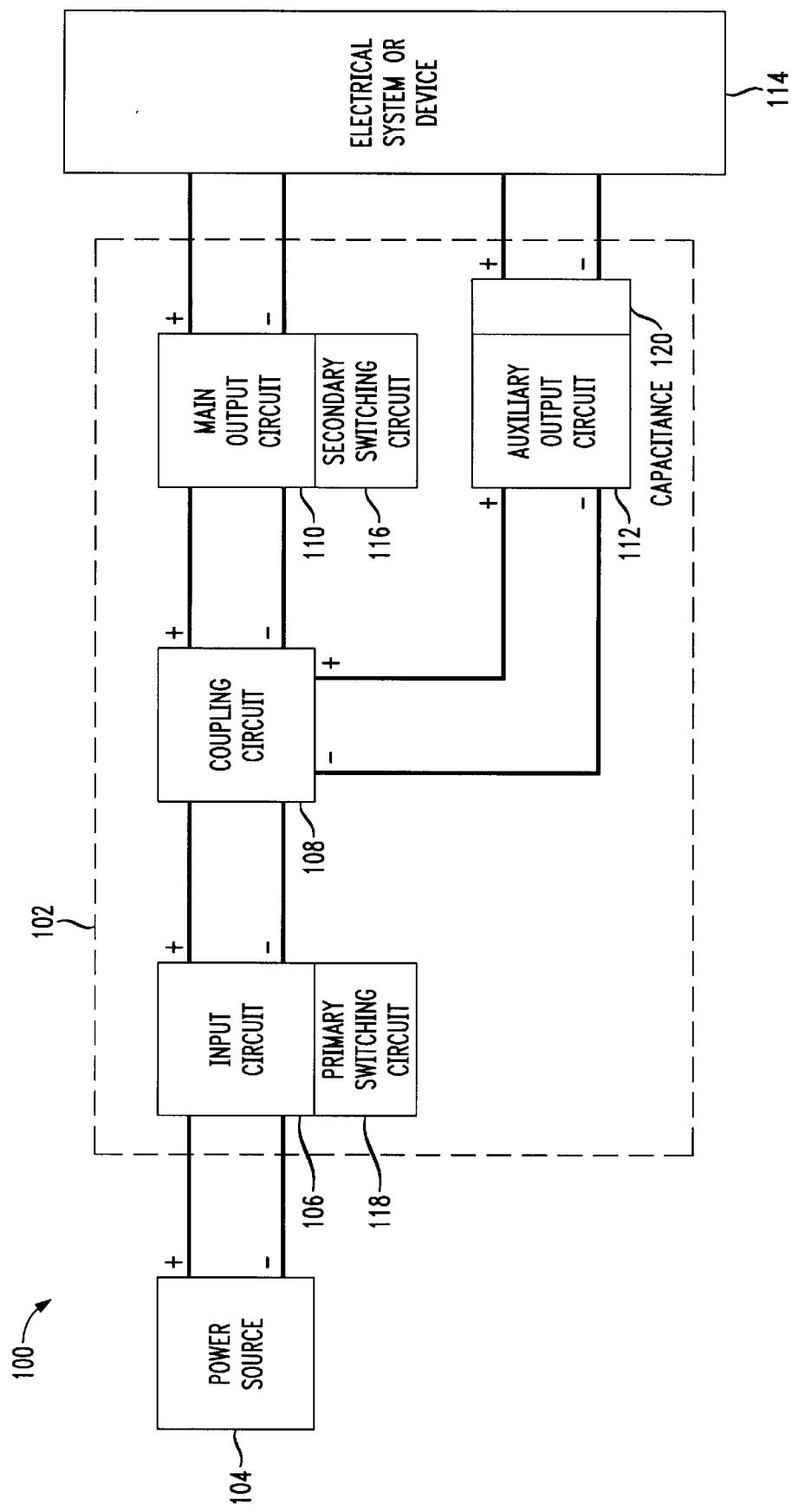
FIG. 1 is a block schematic of a power system incorporating a power converter according to the present invention.

Referring now to FIG. 1, a block schematic illustrating a power system 100 incorporating a power converter 102 pursuant to the present invention is shown. The power system 100 includes a power source 104 connected to supply power to the power input circuit 106 of the power converter 102. Power source 104 may supply electrical power from line power, plant power, battery power, etc. Input circuit 106 typically comprises circuitry to filter and rectify the electrical power received from the power source 104. The input circuit 106 is coupled to the main output circuit 110 and auxiliary output circuit 112 via coupling circuit 108. The coupling circuit 108 can be any type of electrical or magnetic coupling device. In its simplest form, the coupling circuit 108 typically comprises a transformer having a primary winding and two secondary windings wherein the primary winding is connected to the input circuit 106, the first secondary winding is connected to the main output circuit 110, and the second secondary winding is connected to the auxiliary output circuit 112. This effectively couples the main and auxiliary output circuits 110, 112 to the input circuit 106 while electrically isolating the output circuits 110, 112 from each other. The relationship between the secondary windings and the primary winding of the transformer effectively controls the electrical power seen in each output circuit 110, 112. The main and auxiliary output circuits 110, 112 operate to supply this "converted" electrical power to an electrical system or device 114. Additional filtering circuitry may be incorporated in the output circuits 110, 112 to further refine the electrical power output to the electrical system 114.

The auxiliary power circuit 112 supplies electrical power to operate the electrical system's 114 auxiliary functions and circuitry which require continuous electrical power to maintain their integrity, while the main output circuit 110 supplies electrical power to operate the electrical systems 114 main functions and circuitry which are switchable, i.e., which are switched on and off in normal operation. In order to accommodate these different operating characteristics, the main output circuit 110 must be isolated from the auxiliary output circuit 112 such that the main output circuit 110 can be turned on and off without terminating the power supplied by the auxiliary output circuit 112 to the electrical system 114. Simply terminating the power source 104 would terminate power to both output circuits 110, 112 and thus would not maintain the necessary operating characteristics. In addition, since both the main output circuit 110 and the auxiliary output circuit 112 share a common input circuit 106 simply disconnecting the input circuit 102 will similarly shut down both output circuits 110, 112. Instead, as denoted in FIG. 1, a secondary switching circuit 116 is incorporated in the main output circuit 110 in order to deactivate the main output circuit 110 without ceasing operation of the auxiliary output circuit 112.

A more cost-effective and efficient secondary switching circuit 116 can be used in the main output circuit 110 if switching occurs with zero, or approximately zero, current in the main output circuit 110 at the time of the switching. In particular, opening switches in circuitry which still carries significant amounts of current can result in high turn-off losses and, if the switch is mechanical, can cause arcing which results in wear on the switches contacts and a shortened lifespan for the switch. To avoid these problems, a primary switching circuit 118 is incorporated in the input circuit 106 to disconnect the input circuit 106 thereby removing power from the coupling circuit 108 and output circuits 110, 112. In order to change the state of the main output circuit 110, the primary switching circuit 118 should first be used to disconnect the input circuit 106 to remove power from the output circuitry 110, 112. Then, once the current in the main output circuit 110 drops to zero, or about zero, the secondary switching unit 116 can be used to effectuate the desired change in state of the main output circuit 110, i.e., from on to off or vice versa. To ensure there is zero, or near zero, current in the main output circuit 110, one can wait a predetermined amount of time for the current to dissipate in the main output circuit 110 once power from the input circuit 106 is removed, or one can sense or measure the current in the main output circuit 110 directly. Since the current in the main output circuit 110 drops to zero, or about zero, fairly rapidly after the primary switching circuit 118 disconnects the input circuit 106, and since the auxiliary output circuit 112 is generally only required to supply a relatively small amount of electrical power, sufficient capacitance 120 can be used in the auxiliary output circuit 112 to temporarily sustain the necessary auxiliary output power to the electrical system 114.

Thus, by utilizing a primary switching circuit 118 in the input circuit 106, a secondary switching circuit 116 in the main output circuit 110, and capacitance 120 in the auxiliary output circuit 112, the necessary operating characteristics, i.e., the main output circuit 110 may be switchable while the auxiliary output circuit 112 maintains a continuous output to the electrical system 114, may be achieved using cost-effective and efficient components. Moreover, by utilizing a main and auxiliary output circuit 110, 112 which share a common input circuit 106, additional savings in required componentry of the power system 100 are obtained without sacrificing functionality.

Figure 2:
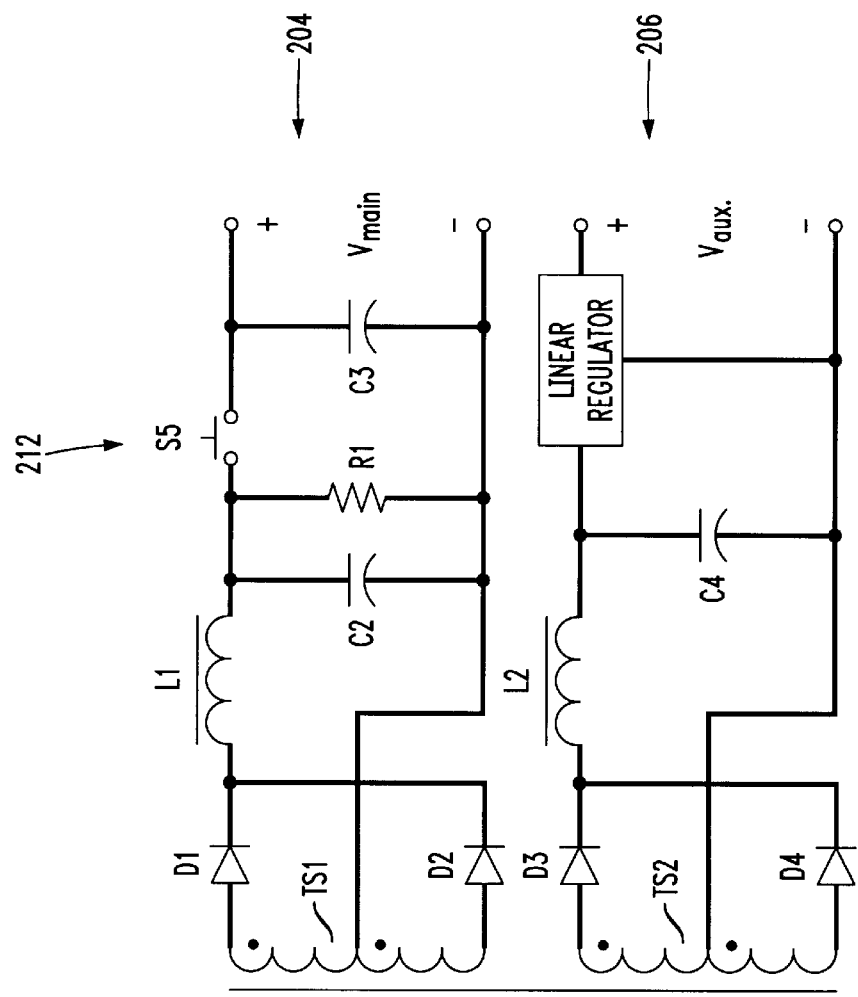
FIG. 2 is a circuit diagram of one embodiment of a power converter used in a power system according to the present invention.
Figure 2:
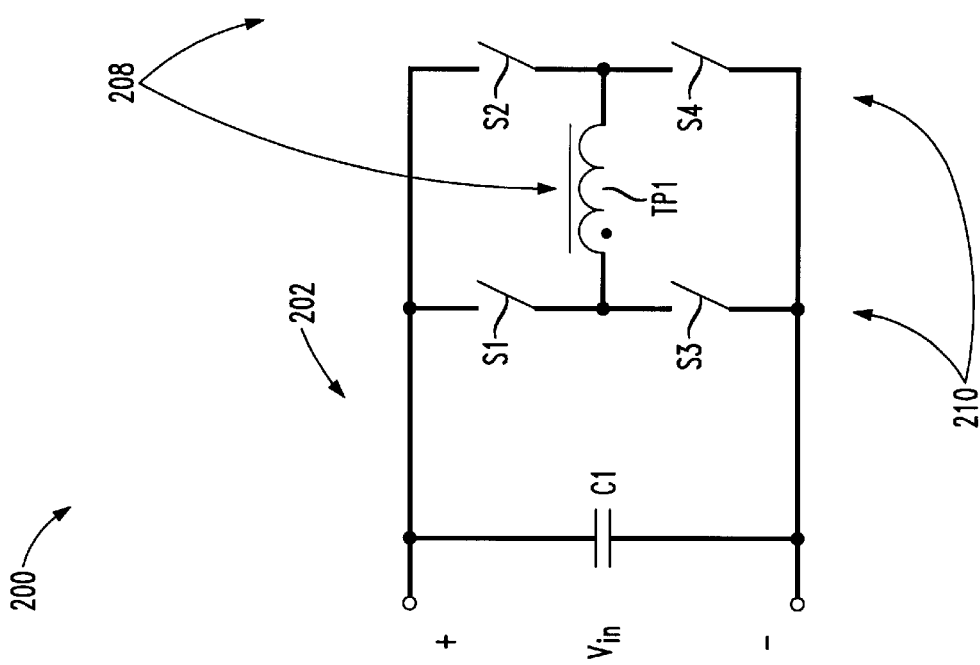

Referring now to FIG. 2, a circuit diagram of an embodiment of a power converter 200 used in a power system according to the present invention is shown. It is important to note that the specific circuitry presented in this embodiment of the power converter is not exclusive. The power system of the present invention can be implemented in a number of different topologies, including power systems where the input and output circuits are coupled in various power converter configurations including forward, fly-back, full-bridge, half-bridge converters, etc. Which type of converter is used generally depends on the power requirements of the load placed on the converter, i.e., the electrical system being supplied power by the converter. Generally, a fly-back converter is used for low power applications, a forward converter is used for medium power applications, and a full-bridge converter is used for high power applications. The method and apparatus of the present invention is independent of the type of converter used and can be effectively implemented in any of these topologies.

The embodiment of the power converter 200 depicted in FIG. 2 is a full-bridge converter. Power converter 200 includes input circuit 202, main output circuit 204, and auxiliary output circuit 206. The main and auxiliary output circuits 204, 206 are coupled to the input circuit 202 via coupling circuit 208. In this embodiment, the coupling circuit 208 comprises a transformer with primary winding TP1, a first secondary winding TS1, and a second secondary winding TS2. Primary winding TP1 is connected to the input circuit 202, first secondary winding TS1 is connected to the main output circuit 204, and second secondary winding TS2 is connected to the auxiliary output circuit 206. Although this embodiment incorporates a transformer, the coupling circuit 208 can be any type of electrically or magnetically coupled device or transformer having the same or similar function as described.

Input circuit 202 is a standard input circuit for a full-bridge converter as is known in the art. Input circuit 202 receives input voltage $V_{in}$ from a power source (not shown). Capacitor C1 is placed across the input terminals of the input circuit 202 to filter, and thereby removes high-frequency ripple and prevents current flowing back to the power source. As with standard fullbridge power converters, power converter 200 uses the four switches S1, S2, S3, and S4 in the input circuit 202 to place a voltage across primary winding TP1 which will induce a voltage across the secondary windings TS1 and TS2 in the output circuits 204, 206. By alternatively activating pairs of the switches the input circuit 202 places the input voltage $V_{in}$ across the primary winding TP1 in alternating polarity. As is well known in the art, the ultimate output voltages $V_{main}$ and $V_{aux}$ created by the converter can be regulated by varying the duty cycle of the switches using a pulse-width modulated controller (not shown) in response to changes in the output conditions. In particular, when more power is required at the output, the duty cycle for the pairs of switches is increased in order to utilize more of the input power.

The typical operation of the input circuit 202 is as follows: When first switch S1 and fourth switch S4 are both closed (while second switch S2 and third switch S3 are open), input voltage $V_{in}$ is placed across the primary winding TP1 thereby creating a current through TP1. Via the transformer, the voltage and current in the primary winding TP1 induces a voltage and current in the secondary windings TS1, TS2. Thus, electrical power is coupled from the power source, through the input circuit 202, to both output circuits 204, 206. Alternatively, when second switch S2 and third switch S3 are both closed (while first switch S1 and fourth switch S4 are open), a reverse polarity input voltage $-V_{in}$ is placed across the primary winding TP1 thereby creating a reverse current through TP1. Via the transformer, this induces a voltage and current in the secondary windings TS1 and TS2. The voltage induced in the output circuits 204, 206 are similarly reverse polarized corresponding to the reverse polarization of the primary winding TP1. Thus, the pairs of switches S1 with S4 and S2 with S3 alternate to place input voltage $V_{in}$ . across the primary winding in alternating polarity. The transformer then induces a voltage with matching polarity across the secondary windings TS1, TS2 in the output circuits 204, 206. The output circuits 204, 206 then use the induced voltages in the secondary windings TS1, TS2 to create the output voltages $V_{main}$, $V_{aux}$. In order to accommodate the reversing polarity of the voltages and currents induced in the transformer, the secondary windings TS1, TS2 are both center-tapped windings.

The main output circuit 204 utilizes the voltage induced in the first secondary winding TS1 to generate the main output voltage $V_{main}$ In particular, when switches S1 and S4 are closed the positive voltage $V_{in}$ is placed across the primary winding. This induces a voltage with similar polarity in the first secondary winding TS1 of the main output circuit 204. This voltage forward biases diode D1 and reverse biases diode D2, meaning current can flow through diode D1 but not diode D2. The center tap of the secondary winding is used as a return. Thus, the top section of the secondary winding TS1, as shown in FIG. 2, is active. Diode D1 is connected in series with inductor L1. Capacitor C2 is connected between the other side of inductor L1, from diode D1, and the return line to the center tap of the secondary winding. Inductor L1 and capacitor C2 operate as a low-pass filter and help to smooth out any ripple in the induced voltage received by the main output circuit 204. Resistor R1 provides a minimum pre-load to keep the output regulated when the electrical system or main load is not connected to the output circuit, i.e., when switch S5 is open. Although any type of electrical switch could be used, in the preferred embodiment switch S5 is a relay switch. Capacitor C3 is placed across the output terminals of the main output circuit to filter, and thereby remove high-frequency ripple, from the output voltage $V_{main}$. Obviously, when switch S5 is open there is no main output power voltage $V_{main}$ supplied.

Alternatively, when switches S2 and S3 are closed, the opposite polarity input voltage $-V_{in}$ is placed across the primary winding. As a result, the induced voltage in the first secondary winding of the main output circuit forward biases diode D2 and reverse biases diode D1, meaning current can flow through diode D2 but not diode D1. Thus, the bottom section of the secondary winding TS1, as shown in FIG. 2, is active. However, since diode D2 is also connected in series with inductor L1 at the same node as diode D1, and since the center tap is still used as a return line, the remainder of the output circuit functions as described above.

The auxiliary output circuit 206 operates similarly to the main output circuit 204. When switches S1 and S4 are closed, a positive voltage $V_{in}$ is induced in the secondary winding. This positive voltage forward biases diode D3 and reverse biases diode D4, meaning current can flow through diode D3 but not diode D4. When switches S2 and S3 are closed, a reverse polarity voltage $-V_{in}$ is induced in the secondary winding. This negative voltage forward biases diode D4 and reverse biases diode D3, meaning current can flow through diode D4 but not diode D3. Both diodes D3 and D4, as well as the return line to the center tap of the secondary winding TS2, are similarly connected to inductor L2 and capacitor C4. Thus, inductor L2 and C4 again operate to filter the induced voltage in the auxiliary output circuit 206. Capacitor C4 should be large enough to power the auxiliary output for short periods of time in which the auxiliary output circuit 206 is not receiving an induced voltage in the second secondary winding TS2. As is known in the art, a linear regulator may be used to regulate the output voltage $V_{aux}$ and to limit the current of the auxiliary output.

This embodiment of the power converter 200, in accordance with the present invention, provides the necessary functionality to supply a continuous auxiliary output $V_{aux}$ and a switchable main output $V_{main}$. In particular, to change the state of the main output $V_{main}$ from on to off or vice versa, the primary switching circuit 210 should first be used to disconnect the input circuit 202 thereby removing power to the main output circuit 204 such that the switching can occur at a zero current state. Although the primary switching circuit 210 could simply be any switch placed in the input circuit 202 to disconnect or remove the input voltage $V_{in}$ from the input circuit 202, in this embodiment the primary switching circuit 210 is formed of switches S1, S2, S3, and S4. The input circuit 202 can be disconnected by simply opening both pairs of switches S1, S4 and S2, S3 which removes the voltage placed on the primary winding TP1, and thus removes the voltages induced in the secondary windings TS1, TS2. After ensuring that the current in the main output circuit 204 is in a zero or near zero current condition, by either waiting a predetermined amount of time for the current to dissipate or by sensing or measuring the current directly, the secondary switching circuit 212 can then be used to connect or disconnect the main output as desired. In this embodiment, the secondary switching circuit 212 comprises relay switch S5 which can be opened to disconnect the main output or can be closed to connect the main output. Once the secondary switching circuit 212, i.e. switch S5, has been set in the proper state, the input circuit 202 can be reconnected in order to resume supplying an induced voltage to the output circuits 204, 206. In order to keep the auxiliary output from being interrupted, the capacitance C4 in the auxiliary output circuit 206 must be sufficiently large to supply the auxiliary output $V_{aux}$ for the short time period in which the input circuit 202 is disconnected.

Figure 3:
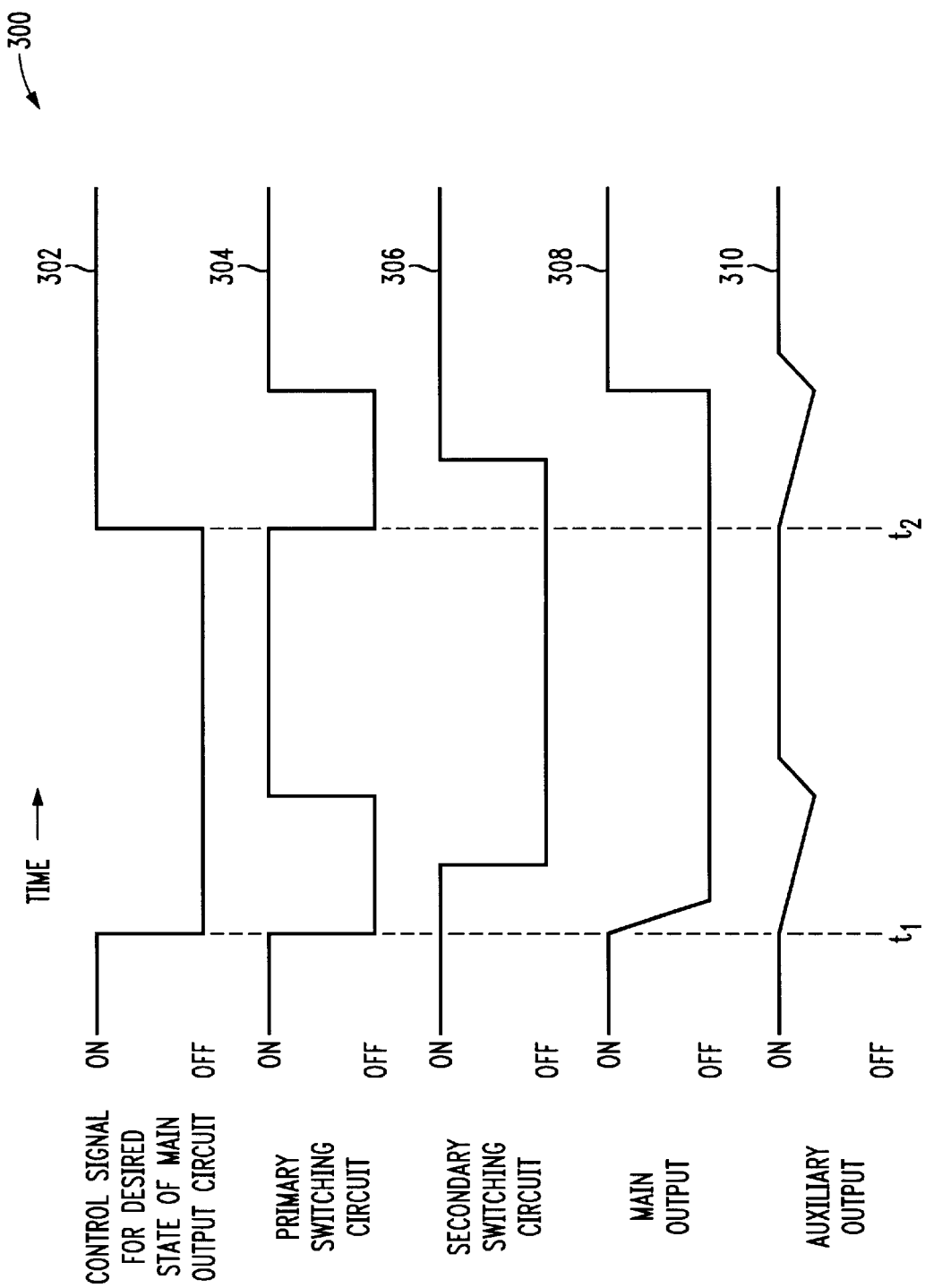
FIG. 3 is a state or timing chart showing the preferred operation of a power system in accordance with the present invention.

Referring now to FIG. 3, a state or timing diagram 300 is shown depicting the preferred operation of a power system in accordance with the present invention. The states of the various portions of the power system are illustrated in traces 302–310. It should be noted, however, that FIG. 3 is for illustrative purposes only and is not necessarily to scale. The traces 302–310 are intended only to show the relative timing of events. To assist in understanding the effect of these changes in state on the power system, reference will be made to the portions of the power system 100 as shown in FIG. 1.

The control signal shown in trace 302 represents the desired state of the main output circuit 110. This would be analogous to a control signal tied to the on/off switch on an electrical system 114, such as a television set. When the control signal is turned off, the main functions of the television such as the video screen and audio speakers should be turned off. As previously discussed, however, this should not affect the television system's memory or other auxiliary functions which typically require continuous power to maintain their integrity. In order to turn off the main functions of the electrical system 114 while maintaining the auxiliary functions of the electrical system 114, the main output circuit 110 is deactivated while the auxiliary output circuit 112 stays activated. Thus, the auxiliary output circuit 112 should continue to supply electrical power to the electrical system 114 even though the main output circuit 110 is not.

To efficiently accomplish these operating characteristics, the control signal as shown in trace 302 should not be used to directly control the power supplied to the electrical system 114 by the main output circuit 110. Instead, the control signal should be used as a trigger to begin the systematic activation and/or deactivation of the main output circuit 110. In particular, when a change of state, i.e. a transition from on to off or vice versa, is sensed in the control signal 302, a series of steps should be taken in order to accomplish the desired change of state in the main output circuit 110. Traces 302–310 illustrate the preferred operation of the power system 100 in accordance with the present invention to systematically control the main output circuit 110.

First, FIG. 3 illustrates a transition in the control signal from on to off at time $t_1$ as shown in trace 302. When the control signal transitions, the primary switching circuit 118 is turned off as shown in trace 304. By turning off the primary switching circuit 118, the input circuit 106 is disconnected. Disconnecting the input circuit 106 effectively removes the electrical power supplied to both the main output circuit 110 and the auxiliary output circuit 112. Accordingly, the electrical power being supplied by both the main output circuit 110 to the electrical system 114 (i.e., the "main output") and the electrical power being supplied by the auxiliary output circuit 112 to the electrical system 114 (i.e., the "auxiliary output") begin to dissipate. The main output and auxiliary output to the electrical system 114 are illustrated in traces 308 and 310, respectively. You will note that the main output and auxiliary output do not dissipate at the same rate. Since the auxiliary output circuit 112 supplies a relatively small amount of power to the electrical system, the auxiliary output can be sustained for a short period of time using capacitance 120 to temporarily supply the auxiliary output to the electrical system 114. As shown in trace 310, the auxiliary output begins to slowly decline after the primary switching circuit 118 is turned off as the capacitance 120 is discharged. So long as this auxiliary output does not decay below the floor voltage or power required to operate the auxiliary functions of the electrical system, the integrity of the auxiliary functions is maintained. Because the main output circuit 110, however, is required to supply a greater power to the electrical system 114, and because the main output is not supported by sufficient capacitance to maintain the requisite supply of power, the main output drops very quickly to a zero current or off condition after the primary switching circuit 110 is turned off, as shown in trace 308. After ensuring that the current in the main output circuit 204 is in a zero or near zero current condition, by either waiting a predetermined amount of time for the current to dissipate or by sensing or measuring the current directly, the secondary switching circuit 116 is turned off, as shown in trace 306. This effectively disconnects the main output circuit 110 such that even when power is reinstated to the input circuit 106, the main output circuit 110 will be off. Accordingly, once the secondary switching circuit 116 has been turned off, the primary switching circuit 118 can be turned on to reconnect the input circuit 106, as shown in trace 304. Reconnecting the input circuit 106 restores the supply of electrical power to the main output circuit 110 and the auxiliary output circuit 112. Once power has been reinstated, the capacitance 120 in the auxiliary output circuit 112 begins to recharge and the auxiliary output returns to a fully charged on state, as shown in trace 310. The main output stays off, however, since the main output circuit 110 has been disconnected via the secondary switching circuit 116. As a result of this systematic control, the desired states have been achieved, that is, the main output has been switched to an off state without interrupting the auxiliary output from its continuous on state. In addition, the main output circuit 110 has been switched off in a zero current state thereby allowing for the use of a more cost-effective and efficient secondary switching circuit 116.

Later, FIG. 3 illustrates a transition in the control signal from off to on at time $t_2$ as shown in trace 302. Again, when the control signal transitions, the primary switching circuit 118 is turned off as shown in trace 304. Turning off the primary switching circuit 118 again disconnects the input circuit 106. Disconnecting the input circuit 106 effectively removes the electrical power supplied to both the main output circuit 110 and the auxiliary output circuit 112. Accordingly, the electrical power being supplied by the auxiliary output circuit 112 to the electrical system 114 (i.e., the "auxiliary output") begins to dissipate, as illustrated in trace 310. As shown in trace 310, the auxiliary output begins to slowly decline after the primary switching circuit 118 is turned off as the capacitance 120 is discharged. Since the main output circuit 110 is already in an off state there is no electrical power being supplied by the main output circuit 110 to the electrical system 114 (i.e., the "main output"). Although the main output is in an off state, the main output circuit 110 still has power being supplied to it until the primary switching circuit 118 is turned off. Once the primary switching circuit 118 is turned off, the power supplied to the main output circuit 110 will rapidly dissipate. After ensuring that the power supplied to the main output circuit 110 has fallen to zero, or near zero, by waiting a predetermined amount of time or by sensing the power directly, the secondary switching circuit 116 can be turned on, as shown in trace 306, in a zero current condition. Turning on the secondary switching circuit 116 effectively reconnects the main output circuit 110 such that when power is reinstated to the input circuit 106, the main output circuit 110 will be on. Accordingly, once the secondary switching circuit 116 has been turned on, the primary switching circuit 118 can be turned on to reconnect the input circuit 106 to the power source 104, as shown in trace 304. Once power has been reinstated, the main output returns to an on state, as shown in trace 308. Similarly, the capacitance 120 in the auxiliary output circuit 112 begins to recharge and the auxiliary output returns to a fully charged on state, as shown in trace 310. As a result of this systematic control, the desired states have been achieved, that is, the main output has been returned to an on state without interrupting the auxiliary output. In addition, the main output circuit 110 has been switched on in a zero current state thereby allowing for the use of a more cost-effective and efficient secondary switching circuit 116.

Unless otherwise noted, all the elements and componentry shown in FIGS. 1, 2, and 3 are commonly available standard electrical components, and each component may be substituted for componentry having the same functionality.

It is to be understood that while the invention has been particularly shown and described with respect to specific embodiments thereof, various changes and modifications in form and detail may be made without departing from the spirit and scope of the invention, and shall be encompassed within the scope of the appended claims.

What is claimed is:

1. An electrical power converter for supplying a switchable main output power and a continuous auxiliary output power to an electrical system, comprising:

an input circuit adapted to receive electrical power from a power source;

a main output circuit coupled to said input circuit and adapted to receive electrical power from said input circuit and to supply a switchable main output power to an electrical system;

an auxiliary output circuit isolated from said main output circuit and coupled to said input circuit adapted to receive electrical power from said input circuit and to supply a continuous auxiliary output power to an electrical system;

a primary switching circuit connected to said input circuit operable in a first state to disconnect said input circuit such that said input circuit is prevented from supplying power to said main output circuit and said auxiliary output circuit, and operable in a second state to connect said input circuit such that said input circuit can supply power to said main output circuit and said auxiliary output circuit;

a secondary switching circuit connected to said main output circuit operable in a first state to disconnect said main output circuit such that said main output circuit is prevented from supplying said main output power to an electrical system, and operable in a second state to connect said main output circuit such that said main output circuit can supply said main output power to an electrical system; and capacitance connected to said auxiliary output circuit which charges when said auxiliary output circuit receives power from said input circuit, and which discharges when said auxiliary output circuit is not receiving power from said input circuit thereby temporarily maintaining said auxiliary output power to an electrical system;

wherein a change of state in the main output circuit is accomplished by first using said primary switching circuit to disconnect said input circuit, then said secondary switching circuit is used to change the state of said main output circuit and finally said primary switching circuit is used to reconnect said input circuit.

2. The electrical power converter as described in claim 1, wherein a change of state in the main output circuit is accomplished by first using said primary switching circuit to disconnect said input circuit, waiting a predetermined amount of time for the current in said main output circuit to drop to about zero, then using said secondary switching circuit to change the state of said main output circuit, and finally using said primary switching circuit to reconnect said input circuit.

3. The electrical power converter as described in claim 1, wherein a change of state in the main output circuit is accomplished by first using said primary switching circuit to disconnect said input circuit, sensing about zero current in said main output circuit, then using said secondary switching circuit to change the state of said main output circuit, and finally using said primary switching circuit to reconnect said input circuit.

4. A method of controlling an electrical power converter to supply a switchable main output power and a continuous auxiliary output power to an electrical system, comprising the steps of:

a. providing a power converter comprising:

an input circuit adapted to receive electrical power from a power source;

a main output circuit coupled to said input circuit and adapted to receive electrical power from said input circuit and to supply a switchable main output power to an electrical system;

an auxiliary output circuit coupled to said input circuit adapted to receive electrical power from said input circuit and to supply a continuous auxiliary output power to an electrical system;

a primary switching circuit connected to said input circuit adapted to disconnect said input circuit such that said input circuit stops supplying power to said main output circuit and said auxiliary output circuit;

a secondary switching circuit connected to said main output circuit adapted to disconnect said main output circuit such that said main output circuit stops supplying main output power;

capacitance connected to said auxiliary output circuit adapted to temporarily maintain auxiliary output power when said auxiliary output circuit is not receiving power;

b. using said primary switching circuit to disconnect said input circuit such that said input circuit is prevented from supplying power to said main output circuit and said auxiliary output circuit;

c. using said secondary switching circuit to disconnect said main output circuit such that said main output circuit is prevented from supplying main output power; and d. using said primary switching circuit to reconnect said input circuit such that said input circuit can supply of power to the main output circuit and auxiliary output circuit.

5. The method of controlling an electrical power converter as described in claim 4, further comprising, between steps b. and c., the step of:

waiting a predetermined amount of time for the current in said main output circuit to drop to about zero.

6. The method of controlling an electrical power converter as described in claim 4, further comprising, between steps b. and c., the step of:

sensing about zero current in said main output circuit.

\* \* \* \* \*